(12) United States Patent
Van Gaal

(10) Patent No.: US 10,031,300 B2
(45) Date of Patent: *Jul. 24, 2018

(54) OPTIC MODULE CAGE ASSEMBLY UTILIZING A STATIONARY HEATSINK

(71) Applicant: Ciena Corporation, Hanover, MD (US)

(72) Inventor: Adrianus Van Gaal, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/818,822

(22) Filed: Nov. 21, 2017

(65) Prior Publication Data

US 2018/0129001 A1 May 10, 2018

Related U.S. Application Data

(63) Continuation of application No. 15/343,762, filed on Nov. 4, 2016, now Pat. No. 9,851,191.

(51) Int. Cl.
*G02B 6/42* (2006.01)
*G02B 6/38* (2006.01)

(52) U.S. Cl.
CPC ......... *G02B 6/4269* (2013.01); *G02B 6/3875* (2013.01); *G02B 6/3879* (2013.01); *G02B 6/4249* (2013.01); *G02B 6/4271* (2013.01); *G02B 6/4292* (2013.01)

(58) Field of Classification Search
CPC .. G02B 6/4269; G02B 6/4292; G02B 6/3875; G02B 6/3879; G02B 6/4271; G02B 6/4249

See application file for complete search history.

(56) References Cited

U.S. PATENT DOCUMENTS 7,371,965 B2   5/2008  Ice
9,246,280 B2   1/2016  Neer et al.

*Primary Examiner* — John M Bedtelyon
(74) *Attorney, Agent, or Firm* — Clements Bernard Walker PLLC; Christopher L. Bernard; Lawrence A. Baratta, Jr.

(57) ABSTRACT

An optic module cage assembly includes an optic module cage body configured to receive and retain one or more optic modules; a stationary heatsink fixedly attached to the optic module cage body; one or more spring members configured to bias the one or more optic modules towards the stationary heatsink when the one or more optic modules are retained in the optic module cage assembly; and one or more floating connectors configured to make electrical connections with the one or more optic modules when the optic modules are retained in the optic module cage assembly.

20 Claims, 7 Drawing Sheets

OPTIC MODULE CAGE ASSEMBLY UTILIZING A STATIONARY HEATSINK

CROSS-REFERENCE TO RELATED APPLICATION(S)

The present patent/applicant is a continuation of U.S. patent application Ser. No. 15/343,762, filed Nov. 4, 2016, and entitled "OPTIC MODULE CAGE ASSEMBLY UTILIZING A STATIONARY HEATSINK," the contents of which are incorporated by reference herein.

FIELD OF THE DISCLOSURE

The proposed solution relates generally to the optical networking field. More specifically, the proposed solution relates to an optic module cage assembly that utilizes a stationary heatsink, and a plurality of optic module cages that utilize a common stationary heatsink. In other words, the optic module cage(s) is/are mounted to the (common) stationary heatsink, as opposed to the associated printed circuit board(s) (PCB(s)), as is done conventionally. This decreases optical system complexity and provides superior optical system cooling characteristics.

BACKGROUND OF THE DISCLOSURE

In conventional optic shelves or racks, the optic module cages that selectively receive and retain the optic modules are mounted directly to the associated PCB(s) via fixed connectors, also mounted directly to the associated PCB(s). Typically, each optic module cage and/or optic module is then placed in selective physical contact and thermal communication with a floating heatsink, such that the optic module is cooled while inserted and in operation. This floating heatsink may be spring-loaded or the like, and a separate floating heatsink is typically required for and coupled to each optic module cage. The use of separate floating heatsinks necessarily limits the size of each, thereby limiting the cooling effectiveness of each. This becomes problematic when, for example, the temperature maximum for each optic module is 70 degrees C. or the like, especially for a downstream optic module that is subjected to compounded heating from other upstream optic modules. It simply becomes impossible to cool the optical system without utilizing more complex and expensive cooling systems. The use of heat pipes is not practical, as each floating heatsink floats independently. Likewise, multiple fans and thermoelectric coolers would be required to work with the separate floating heatsinks. Thus, what is still needed in the art is an improved methodology for cooling an optical system.

BRIEF SUMMARY OF THE DISCLOSURE

In various embodiments, the proposed solution provides an optic module cage assembly that utilizes a stationary heatsink, and a plurality of optic module cages that utilize a common stationary heatsink. In other words, the optic module cage(s) is/are mounted to the (common) stationary heatsink, as opposed to the associated PCB(s), as is done conventionally. This decreases optical system complexity and provides superior optical system cooling characteristics. Each of the optic modules is electrically coupled to the associated PCB using a floating connector that accommodates a degree of movement of the optic module as it engages the stationary heatsink. The use of a common stationary heatsink to cool multiple optic modules allows a relatively large, and therefore very effective, heatsink having a variety of shapes to be used. This common stationary heatsink may readily be thermally coupled to a unified heat pipe, an integrated fan, and/or a thermoelectric cooler. Thus, even the cooling of a downstream optic module that is subjected to compounded heating from other upstream optic modules is made possible.

In one embodiment, an optic module cage assembly includes an optic module cage body configured to receive and retain one or more optic modules; a stationary heatsink fixedly attached to the optic module cage body; one or more spring members configured to bias the one or more optic modules towards the stationary heatsink when the one or more optic modules are retained in the optic module cage body; and one or more floating connectors configured to make electrical connections with the one or more optic modules when the optic modules are retained in the optic module cage. The stationary heatsink can be disposed along one or more of a top and a bottom of the optic module cage body in a vertically-oriented configuration. The stationary heatsink can be disposed along one or more of either side of the optic module cage body in a horizontally-oriented configuration. The stationary heatsink can be a first stationary heatsink, and the optic module cage assembly can further include a second stationary heatsink fixedly attached to the optic module cage body. The optic module cage assembly can further include a floating heatsink coupled to the one or more spring members. The optic module cage assembly can further include a heat pipe thermally coupled to the stationary heatsink; and a plurality of heatsink fins that are thermally coupled to the heat pipe. The optic module cage assembly can further include a fan that is thermally coupled to the stationary heatsink. The optic module cage assembly can further include a thermoelectric cooler that is thermally coupled to the stationary heatsink. The optical module cage body can have at least two optic modules retained therein and each of the at least two optic modules is in physical contact with a portion of the stationary heatsink. The optical module cage body can have a plurality of optic modules in a stacked and side-by-side configuration such that a first optic module is adjacent to a second optic module on a side and adjacent to a third optic module on a bottom.

In another embodiment, a method of utilizing one or more optic modules in an optic module cage assembly includes selectively inserting the one or more optic modules in the optic module cage assembly; contacting a stationary heatsink fixedly attached to the optic module cage body by the one or more optic modules; biasing the one or more optic modules towards the stationary heatsink when the one or more optic modules are retained in the optic module cage body; and connecting the one or more optic modules to respective one or more floating connectors configured to make electrical connections with the one or more optic modules. The stationary heatsink can be disposed along one or more of a top and a bottom of the optic module cage body in a vertically-oriented configuration. The stationary heatsink can be disposed along one or more of either side of the optic module cage body in a horizontally-oriented configuration. The stationary heatsink can be a first stationary heatsink, and the method can further include contacting a second stationary heatsink fixedly attached to the optic module cage body by the one or more optic modules. The biasing can be via a floating heatsink coupled to one or more spring members. The method can further include operating a heat pipe to provide heat from the stationary heatsink to a plurality of heatsink fins that are thermally coupled to the heat pipe. The method can further include operating a fan that is thermally coupled to the stationary heatsink. The method can further include operating a thermoelectric cooler that is thermally coupled to the stationary heatsink. The optical module cage body can have at least two optic modules retained therein and each of the at least two optic modules is in physical contact with a portion of the stationary heatsink.

In a further embodiment, an optic module cage body assembly in one or more of a stacked configuration and a side-by-side configuration includes an optic module cage body configured to receive and retain a plurality of optic modules; a stationary heatsink fixedly attached to the optic module cage body; one or more spring members configured to bias the one or more optic modules towards the stationary heatsink when the one or more optic modules are retained in the optic module cage body; and one or more floating connectors configured to make electrical connections with the one or more optic modules when the optic modules are retained in the optic module cage, wherein at least two optic modules are adjacent to one another vertically in the stacked configuration and at least two optic modules are adjacent to one another horizontally in the side-by-side configuration.

In one embodiment, the proposed solution provides an optic module cage assembly configured to selectively receive and retain an optic module, including: an optic module cage body configured to selectively receive and retain the optic module; a stationary heatsink fixedly attached to a side of the optic module cage body; one or more spring members disposed opposite the stationary heatsink and configured to bias the optic module towards the stationary heatsink when the optic module is selectively inserted into the optic module cage body; and a floating connector disposed partially within the optic module cage body and configured to make an electrical connection with the optic module when the optic module is selectively inserted into the optic module cage body, wherein the floating connector is configured to move in a constrained manner with respect to the optic module cage body. Optionally, the stationary heatsink includes a protruding portion that protrudes through the side of the optic module cage body and makes direct physical contact with the optic module when the optic module is selectively inserted into the optic module cage body and biased towards the stationary heatsink. Optionally, the optic module cage assembly also includes a floating heatsink coupled to the one or more spring members. Optionally, the floating heatsink includes a protruding portion that protrudes through another side of the optic module cage body and makes direct physical contact with the optic module when the optic module is selectively inserted into the optic module cage body. Optionally, the optic module cage assembly further includes a heat pipe that is thermally coupled to the stationary heatsink. Optionally, the optic module cage assembly still further includes a plurality of heatsink fins that are thermally coupled to the heat pipe. Optionally, the optic module cage assembly still further includes a fan that is thermally coupled to the stationary heatsink. Optionally, the optic module cage assembly still further includes a thermoelectric cooler that is thermally coupled to the stationary heatsink.

In another embodiment, the proposed solution provides an optic module cage assembly configured to selectively receive and retain a plurality of optic modules, including: an optic module cage body configured to selectively receive and retain the plurality of optic modules; a stationary heatsink fixedly attached to a side of the optic module cage body; one or more spring members disposed opposite the stationary heatsink and configured to bias the optic modules towards the stationary heatsink when the optic modules are selectively inserted into the optic module cage body; and a plurality of floating connectors disposed partially within the optic module cage body and configured to make electrical connections with the optic modules when the optic modules are selectively inserted into the optic module cage body, wherein the floating connectors are each configured to move in a constrained manner with respect to the optic module cage body. Optionally, the stationary heatsink includes a protruding portion that protrudes through the side of the optic module cage body and makes direct physical contact with the optic modules when the optic modules are selectively inserted into the optic module cage body and biased towards the stationary heatsink. Optionally, the optic module cage assembly also includes one or more floating heatsinks coupled to the one or more spring members. Optionally, the floating heatsinks each include a protruding portion that protrudes through another side of the optic module cage body and makes direct physical contact with an associated optic module when the optic module is selectively inserted into the optic module cage body. Optionally, the optic module cage assembly further includes a heat pipe that is thermally coupled to the stationary heatsink. Optionally, the optic module cage assembly still further includes a plurality of heatsink fins that are thermally coupled to the heat pipe. Optionally, the optic module cage assembly still further includes a fan that is thermally coupled to the stationary heatsink. Optionally, the optic module cage assembly still further includes a thermoelectric cooler that is thermally coupled to the stationary heatsink.

In a further embodiment, the proposed solution provides an optic module cage assembly configured to selectively receive and retain an optic module, including: an optic module cage body coupled to a faceplate of an optic shelf or rack and configured to selectively receive and retain the optic module; a stationary heatsink fixedly attached to a side of the optic module cage body; one or more spring members disposed opposite the stationary heatsink and configured to bias the optic module towards the stationary heatsink when the optic module is selectively inserted into the optic module cage body; and a floating connector coupled to a printed circuit board, disposed partially within the optic module cage body, and configured to make an electrical connection with the optic module when the optic module is selectively inserted into the optic module cage body, wherein the floating connector is configured to move in a constrained manner with respect to the optic module cage body; wherein the optic module cage body is not fixedly secured to the printed circuit board. Optionally, the stationary heatsink includes a protruding portion that protrudes through the side of the optic module cage body and makes direct physical contact with the optic module when the optic module is selectively inserted into the optic module cage body and biased towards the stationary heatsink. Optionally, the optic module cage assembly also includes a floating heatsink coupled to the one or more spring members. Optionally, the floating heatsink includes a protruding portion that protrudes through another side of the optic module cage body and makes direct physical contact with the optic module when the optic module is selectively inserted into the optic module cage body. Optionally, the optic module cage assembly further includes a heat pipe that is thermally coupled to the stationary heatsink. Optionally, the optic module cage assembly still further includes a plurality of heatsink fins that are thermally coupled to the heat pipe.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various embodiments, the proposed solution provides an optic module cage assembly that utilizes a stationary heatsink, and a plurality of optic module cages that utilize a common stationary heatsink. In other words, the optic module cage(s) is/are mounted to the (common) stationary heatsink, as opposed to the associated PCB(s), as is done conventionally. This decreases optical system complexity and provides superior optical system cooling characteristics. Each of the optic modules is electrically coupled to the associated PCB using a floating connector that accommodates a degree of movement of the optic module as it engages the stationary heatsink. The use of a common stationary heatsink to cool multiple optic modules allows a relatively large, and therefore very effective, heatsink having a variety of shapes to be used. This common stationary heatsink may readily be thermally coupled to a unified heat pipe, an integrated fan, and/or a thermoelectric cooler. Thus, even the cooling of a downstream optic module that is subjected to compounded heating from other upstream optic modules is made possible.

Figure 1:
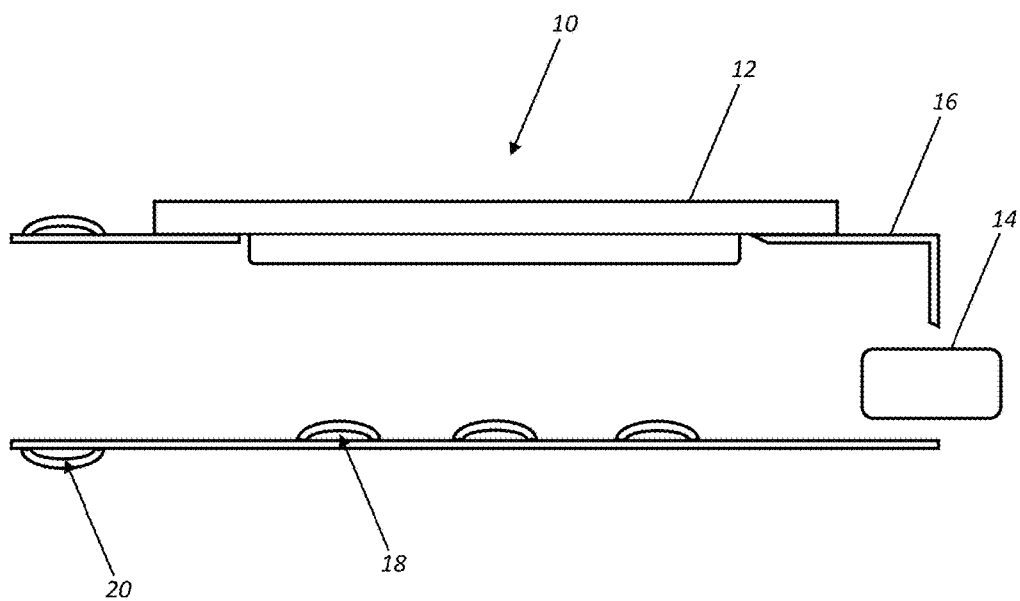
FIG. 1 is a schematic diagram illustrating one embodiment of the optic module cage assembly of the proposed solution utilizing a stationary heatsink and a floating connector.

FIG. 1 is a schematic diagram illustrating one embodiment of the optic module cage assembly 10 of the proposed solution utilizing a stationary heatsink 12 and a floating connector 14. Specifically, the stationary heatsink 12 is bonded or otherwise fixedly attached to the optic module cage body 16. A portion of the stationary heatsink 12 protrudes through the optic module cage body 16 such that it selectively makes direct physical contact with an inserted optic module (not illustrated). The optic module cage body 16 includes one or more internal spring members 18 that serves to bias the inserted optic module into secure contact with the protruding portion of the stationary heatsink 12. The optic module cage body 16 also includes one or more gaskets that assist in securing the optic module cage body 16 within the optic shelf or rack (not illustrated) via the associated faceplate (not illustrated). The floating connector 14 is disposed near the back of the optic module cage body 16 and is permitted a degree of motion (especially up-and-down motion), such that a secure electrical connection may be made with the inserted optic module despite it being biased by the one or more internal spring members 18 towards the protruding portion of the stationary heatsink 12. It will be readily apparent to those of ordinary skill in the art that a variety of materials, similar configurations, spring members 18 and 20, and floating connectors 14 may be used, as appropriate. For example, the stationary heatsink 12 may be disposed along the top or bottom of the optic module cage body 16 in a vertically-oriented configuration and along either side of the optic module cage body 16 in a horizontally-oriented configuration. The floating connector 14 preferably makes a flexible electrical connection to the associated PCB (not illustrated). Advantageously, the stationary heatsink 12 may span multiple optic module cage bodies 16/multiple optic modules as a common stationary heatsink 12, as is described in greater detail herein below.

Figure 2:
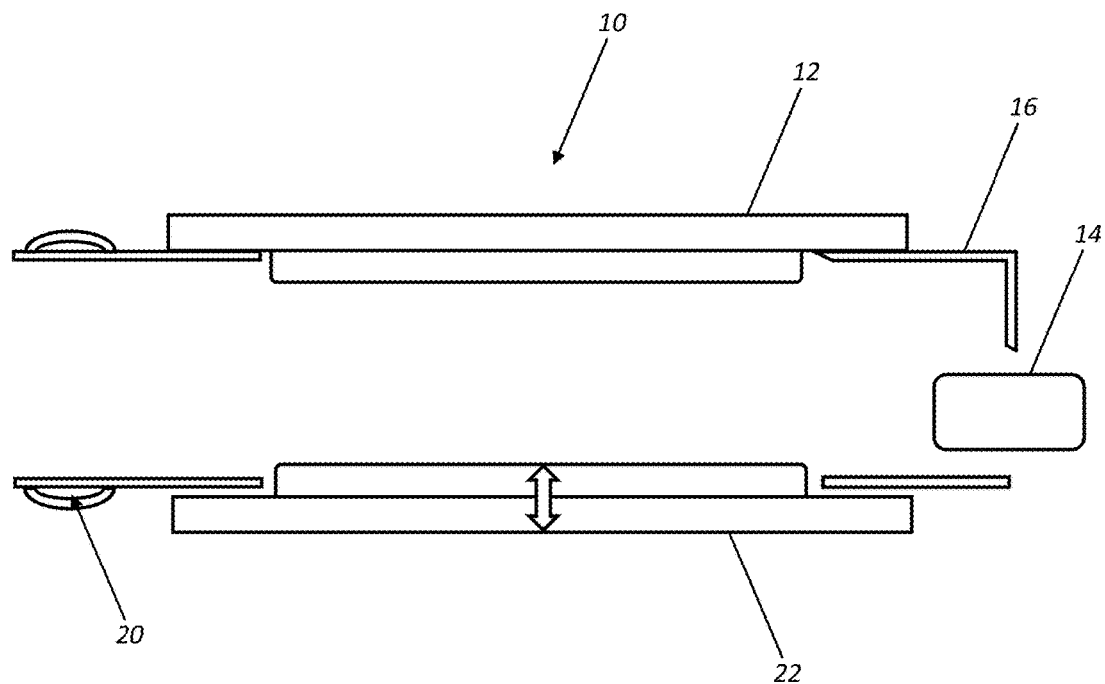
FIG. 2 is a schematic diagram illustrating another embodiment of the optic module cage assembly of the proposed solution utilizing a stationary heatsink, a floating heatsink, and a floating connector.

FIG. 2 is a schematic diagram illustrating another embodiment of the optic module cage assembly 10 of the proposed solution utilizing a stationary heatsink 12, a floating heatsink 22, and a floating connector 14. Specifically, the stationary heatsink 12 is bonded or otherwise fixedly attached to the optic module cage body 16. A portion of the stationary heatsink 12 protrudes through the optic module cage body 16 such that it selectively makes direct physical contact with an inserted optic module (not illustrated). The floating heatsink 22 is disposed opposite the stationary heatsink 12 and includes a portion that protrudes through the optic module cage body 16 such that it selectively makes direct physical contact with the inserted optic module opposite the stationary heatsink 12. The floating heatsink 22 is spring loaded or the like such that it serves to bias the inserted optic module into secure contact with the protruding portion of the stationary heatsink 12. The optic module cage body 16 also includes one or more gaskets that assist in securing the optic module cage body 16 within the optic shelf or rack (not illustrated) via the associated faceplate (not illustrated). The floating connector 14 is disposed near the back of the optic module cage body 16 and is permitted a degree of motion (especially up-and-down motion), such that a secure electrical connection may be made with the inserted optic module despite it being biased by the floating heatsink 22 towards the protruding portion of the stationary heatsink 12. Again, it will be readily apparent to those of ordinary skill in the art that a variety of materials, similar configurations, spring members 20, and floating connectors 14 may be used, as appropriate. For example, the stationary heatsink 12 and the floating heatsink may be disposed interchangeably along the top or bottom of the optic module cage body 16 in a vertically-oriented configuration and along either side of the optic module cage body 16 in a horizontally-oriented configuration. The floating connector 14 preferably makes a flexible electrical connection to the associated PCB (not illustrated). Advantageously, the stationary heatsink 12 and the floating heatsink 22 may span multiple optic module cage bodies 16/multiple optic modules as a common stationary heatsink 12 and a common floating heatsink 22, as is described in greater detail herein below.

Figure 3:
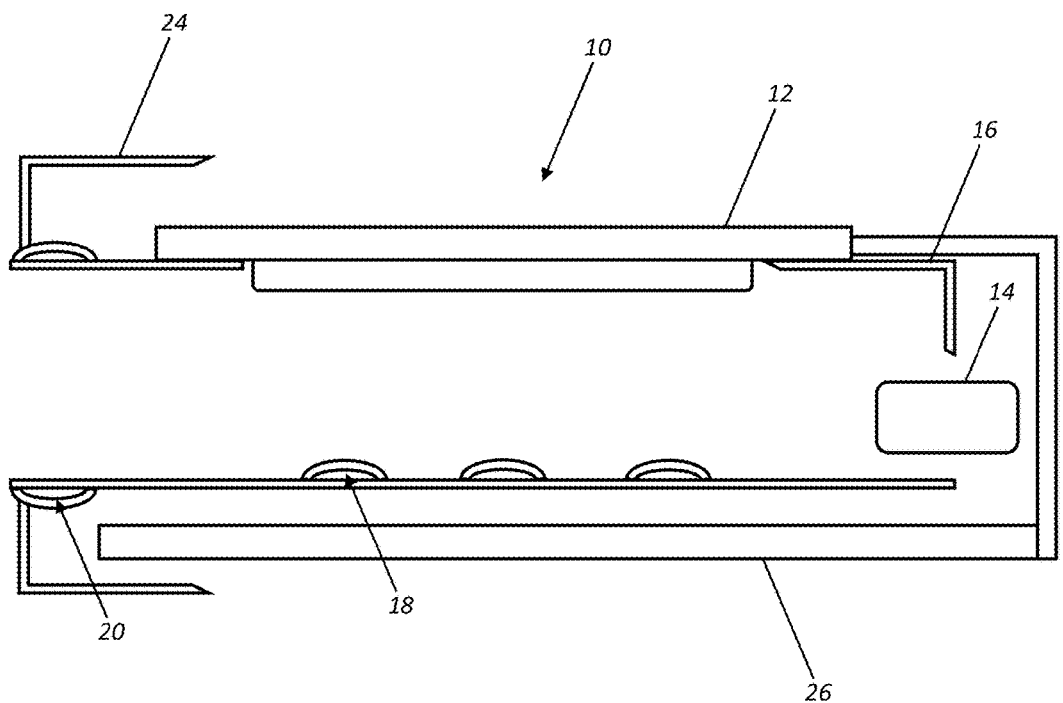
FIG. 3 is a schematic diagram illustrating a further embodiment of the optic module cage assembly of the proposed solution utilizing a common stationary heatsink in direct contact with the optic module and a floating connector.

FIG. 3 is a schematic diagram illustrating a further embodiment of the optic module cage assembly 10 of the proposed solution utilizing a common stationary heatsink 12 in direct contact with an inserted optic module (not illustrated) and a floating connector 14. Specifically, the stationary heatsink 12 is bonded or otherwise fixedly attached to the optic module cage body 16. A portion of the stationary heatsink 12 protrudes through the optic module cage body 16 such that it selectively makes direct physical contact with the inserted optic module. The optic module cage body 16 includes one or more internal spring members 18 that serves to bias the inserted optic module into secure contact with the protruding portion of the stationary heatsink 12. The optic module cage body 16 also includes one or more gaskets that assist in securing the optic module cage body 16 within the optic shelf or rack (not illustrated) via the associated faceplate 24. In this embodiment, the stationary heatsink 12 may be thermally coupled to another heatsink or other structure 26 disposed on another side of the optic module cage body 16 or in another location, for example. The floating connector 14 is disposed near the back of the optic module cage body 16 and is permitted a degree of motion (especially up-and-down motion), such that a secure electrical connection may be made with the inserted optic module despite it being biased by the one or more internal spring members 18 towards the protruding portion of the stationary heatsink 12. Again, it will be readily apparent to those of ordinary skill in the art that a variety of materials, similar configurations, spring members 18 and 20, and floating connectors 14 may be used, as appropriate. For example, the stationary heatsink 12 and the other heatsink or other structure 26 may be disposed interchangeably along the top or bottom of the optic module cage body 16 in a vertically-oriented configuration and along either side of the optic module cage body 16 in a horizontally-oriented configuration. The floating connector 14 preferably makes a flexible electrical connection to the associated PCB (not illustrated). Advantageously, the stationary heatsink 12 and the other heatsink or other structure 26 may span multiple optic module cage bodies 16/multiple optic modules as a common stationary heatsink 12 and a common other heatsink or other structure 26, as is described in greater detail herein below.

Figure 4:
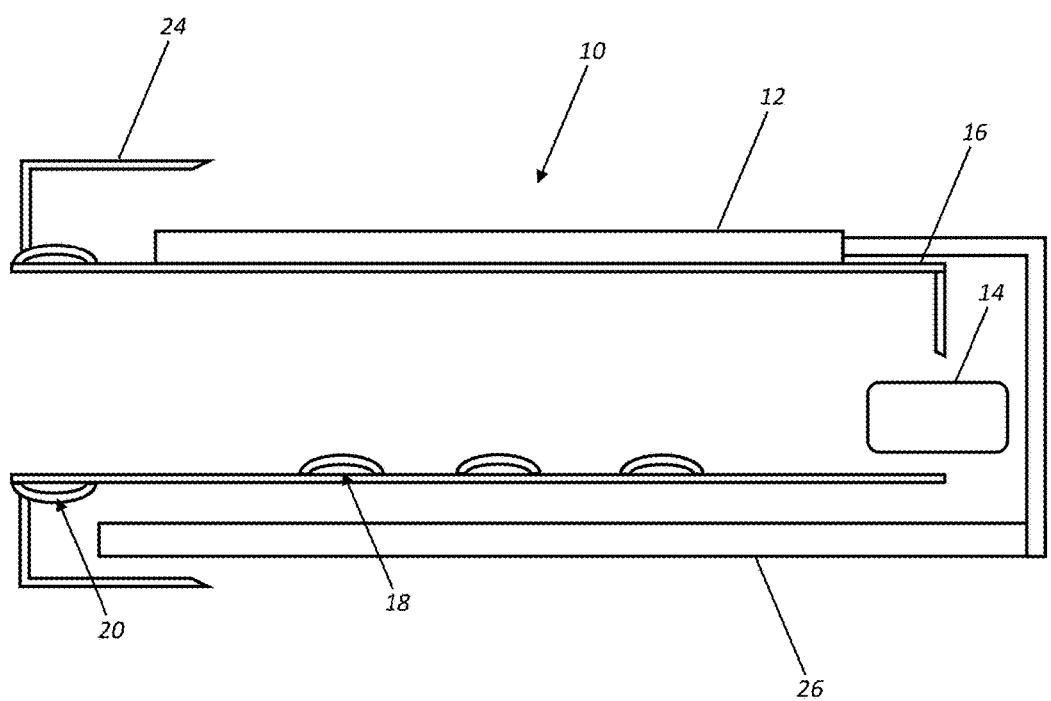
FIG. 4 is a schematic diagram illustrating a still further embodiment of the optic module cage assembly of the proposed solution utilizing a common stationary heatsink in indirect contact with the optic module through the optic module cage and a floating connector.

FIG. 4 is a schematic diagram illustrating a still further embodiment of the optic module cage assembly 10 of the proposed solution utilizing a common stationary heatsink 12 in indirect contact with an inserted optic module (not illustrated) through the optic module cage 16 and a floating connector 14. Specifically, the stationary heatsink 12 is bonded or otherwise fixedly attached to the optic module cage body 16. The stationary heatsink 12 is in thermal communication with the inserted optic module through the intervening wall of the optic module cage body 16. The optic module cage body 16 includes one or more internal spring members 18 that serves to bias the inserted optic module into secure contact with the wall of the optic module cage body 16 adjacent the stationary heatsink 12. The optic module cage body 16 also includes one or more gaskets that assist in securing the optic module cage body 16 within the optic shelf or rack (not illustrated) via the associated faceplate 24. In this embodiment, the stationary heatsink 12 may be thermally coupled to another heatsink or other structure 26 disposed on another side of the optic module cage body 16 or in another location, for example. The floating connector 14 is disposed near the back of the optic module cage body 16 and is permitted a degree of motion (especially up-and-down motion), such that a secure electrical connection may be made with the inserted optic module despite it being biased by the one or more internal spring members 18 towards the wall of the optic module cage body 16 adjacent the stationary heatsink 12. Again, it will be readily apparent to those of ordinary skill in the art that a variety of materials, similar configurations, spring members 18 and 20, and floating connectors 14 may be used, as appropriate. For example, the stationary heatsink 12 and the other heatsink or other structure 26 may be disposed interchangeably along the top or bottom of the optic module cage body 16 in a vertically-oriented configuration and along either side of the optic module cage body 16 in a horizontally-oriented configuration. The floating connector 14 preferably makes a flexible electrical connection to the associated PCB (not illustrated). Advantageously, the stationary heatsink 12 and the other heatsink or other structure 26 may span multiple optic module cage bodies 16/multiple optic modules as a common stationary heatsink 12 and a common other heatsink or other structure 26, as is described in greater detail herein below.

Figure 5:
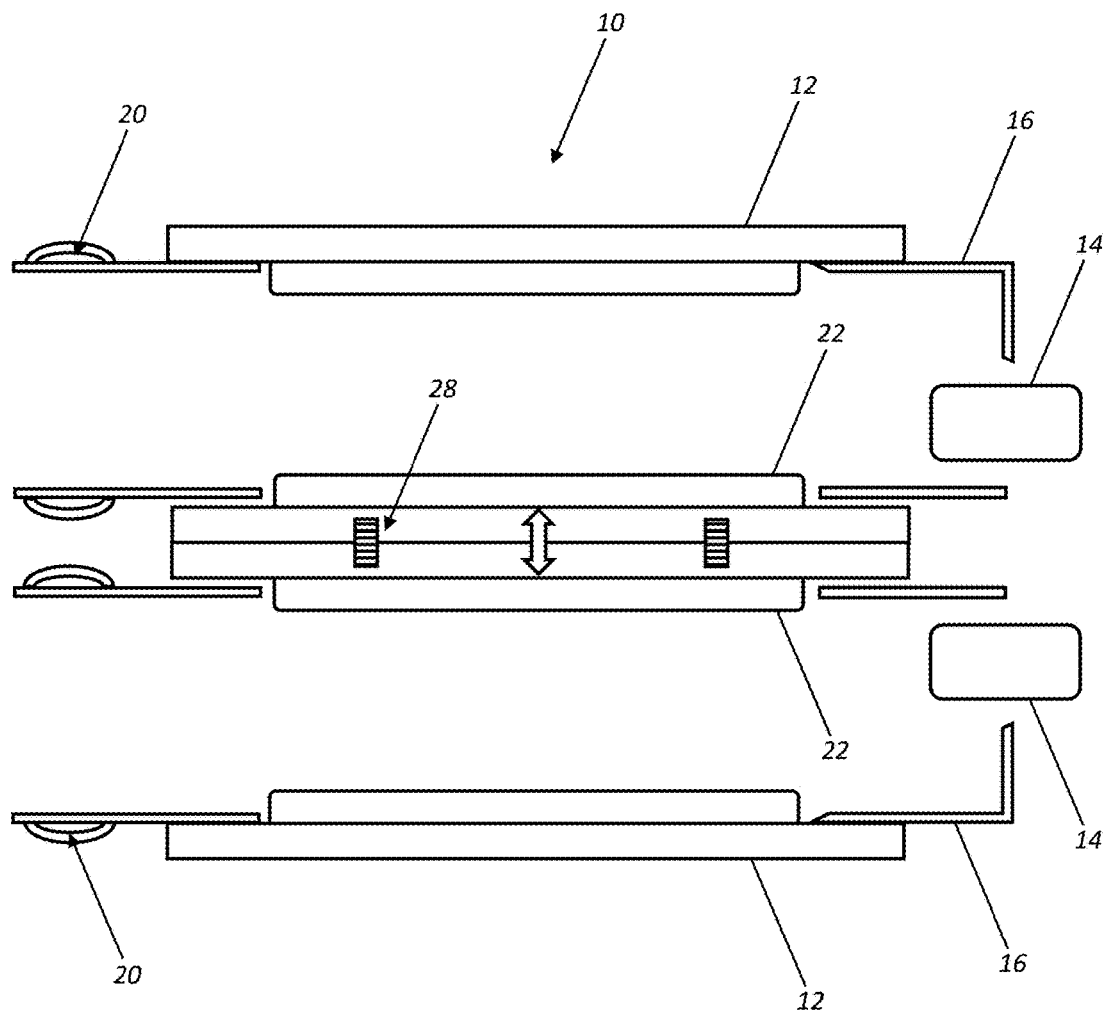
FIG. 5 is a schematic diagram illustrating a still further embodiment of the optic module cage assembly of the proposed solution utilizing a plurality of stationary heatsinks, a plurality of floating heatsinks, and a plurality of floating connectors to accommodate a plurality of optic modules in a stacked or side-by-side configuration.

FIG. 5 is a schematic diagram illustrating a still further embodiment of the optic module cage assembly 10 of the proposed solution utilizing a plurality of stationary heatsinks 12, a plurality of floating heatsinks (or spring plates) 22, and a plurality of floating connectors 14 to accommodate a plurality of inserted optic modules (not illustrated) in a stacked or side-by-side configuration. Specifically, the stationary heatsinks 12 are bonded or otherwise fixedly attached to the optic module cage bodies 16. A portion of each of the stationary heatsinks 12 protrudes through the associated optic module cage body 16 such that it selectively makes direct physical contact with the associated inserted optic module. The floating heatsinks 22 are disposed adjacent to one another opposite the stationary heatsinks 12, and each includes a portion that protrudes through the associated optic module cage body 16 such that it selectively makes direct physical contact with the associated inserted optic module opposite the stationary heatsinks 12. The floating heatsinks 22 are biased apart and each into their associated optic module cage body 16 by one or more intervening spring members 28 such that each floating heatsink 22 serves to bias the associated inserted optic module into secure contact with the protruding portion of the associated stationary heatsink 12. In this respect, mirror image optic module cage assemblies 10 are provided and form a collective whole. The optic module cage bodies 16 also include one or more gaskets that assist in securing the optic module cage bodies 16 within the optic shelf or rack (not illustrated) via the associated faceplate (not illustrated). The floating connectors 14 are disposed near the back of the optic module cage bodies 16 and are each permitted a degree of motion (especially up-and-down motion), such that a secure electrical connection may be made with the associated inserted optic module despite it being biased by the associated floating heatsink 22 towards the protruding portion of the associated stationary heatsink 12. Again, it will be readily apparent to those of ordinary skill in the art that a variety of materials, similar configurations, spring members 20, and floating connectors 14 may be used, as appropriate. For example, the stationary heatsinks 12 and the floating heatsinks may be disposed interchangeably along the top or bottom of the optic module cage body 16 in a vertically-oriented configuration and along either side of the optic module cage body 16 in a horizontally-oriented configuration. The floating connectors 14 preferably make a flexible electrical connection to the associated PCB (not illustrated). Advantageously, the stationary heatsinks 12 may span multiple optic module cage bodies 16/multiple optic modules as common stationary heatsinks 12, as is described in greater detail herein below.

Figure 6:
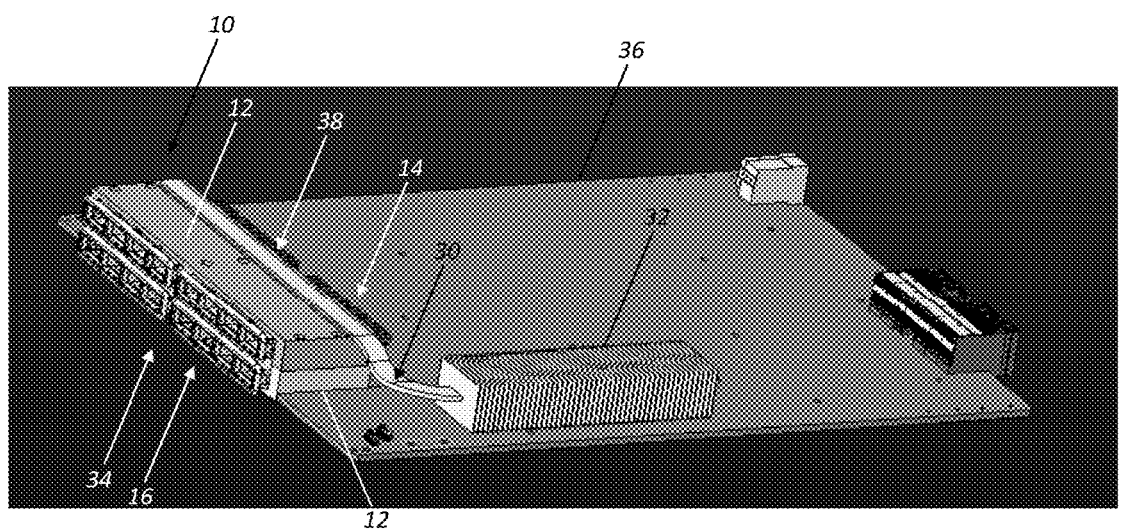
FIG. 6 is a perspective diagram illustrating a still further embodiment of the optic module cage assembly of the proposed solution utilizing a plurality of stationary heatsinks, a plurality of floating heatsinks, and a plurality of floating connectors to accommodate a plurality of optic modules in a stacked or side-by-side configuration, with a heat pipe and plurality of heatsink fins thermally coupled to one or more of the stationary heatsinks to enhance cooling.

FIG. 6 is a perspective diagram illustrating a still further embodiment of the optic module cage assembly 10 of the proposed solution utilizing a common stationary heatsink 12, a plurality of floating heatsinks (not illustrated), and a plurality of floating connectors 14 to accommodate a plurality of optic modules (not illustrated) in a stacked or side-by-side configuration, with a heat pipe 30 and plurality of heatsink fins 32 thermally coupled to one or more of the common stationary heatsinks 12 to enhance cooling. Specifically, the common stationary heatsinks 12 are disposed about and bonded or otherwise fixedly attached to the optic module cage bodies 16. A portion of each of the common stationary heatsinks 12 protrudes through the associated optic module cage body 16 such that it selectively makes direct physical contact with the associated inserted optic module. Alternatively, each of the common stationary heatsinks 12 is in thermal communication with the inserted optic modules through the intervening wall of the optic module cage bodies 16. The floating heatsinks are disposed adjacent to one another within and opposite the common stationary heatsinks 12, and each includes a portion that protrudes through the associated optic module cage body 16 such that it selectively makes direct physical contact with the associated inserted optic module opposite the common stationary heatsinks 12. The floating heatsinks are biased apart and each into their associated optic module cage body 16 by one or more intervening spring members (not illustrated) such that each floating heatsink serves to bias the associated inserted optic module into secure contact with the protruding portion of the associated common stationary heatsink 12, for example. In this respect, mirror image optic module cage assemblies 10 are provided and form a collective whole. The optic module cage bodies 16 also include one or more external spring members (not illustrated) that assist in securing the optic module cage bodies 16 within the optic shelf or rack (not illustrated) via the associated faceplate (not illustrated). The floating connectors 14 are disposed near the back of the optic module cage bodies 16 and are each permitted a degree of motion (especially up-and-down motion), such that a secure electrical connection may be made with the associated inserted optic module despite it being biased by the associated floating heatsink towards the protruding portion of the associated common stationary heatsink 12. As is illustrated, the optic module cage assembly 10 is disposed in a recess 34 manufactured into the associated PCB 36, as opposed to being fixedly secured to the PCB 36. A plurality of heatsink fins 32 are mounted on the PCB 36 and thermally coupled to one or more of the common stationary heatsinks 12 via a prismatic heat pipe 30, such as a flat heat pipe, which may be disposed in one or more recesses 38 manufactured into the one or more common stationary heatsinks 12. Again, it will be readily apparent to those of ordinary skill in the art that a variety of materials, similar configurations, spring members, and floating connectors 14 may be used, as appropriate. For example, the floating connectors 14 preferably make a flexible electrical connection to the associated PCB 36. Advantageously, the common stationary heatsinks 12 span multiple optic module cage bodies 16/multiple optic modules.

Figure 7:
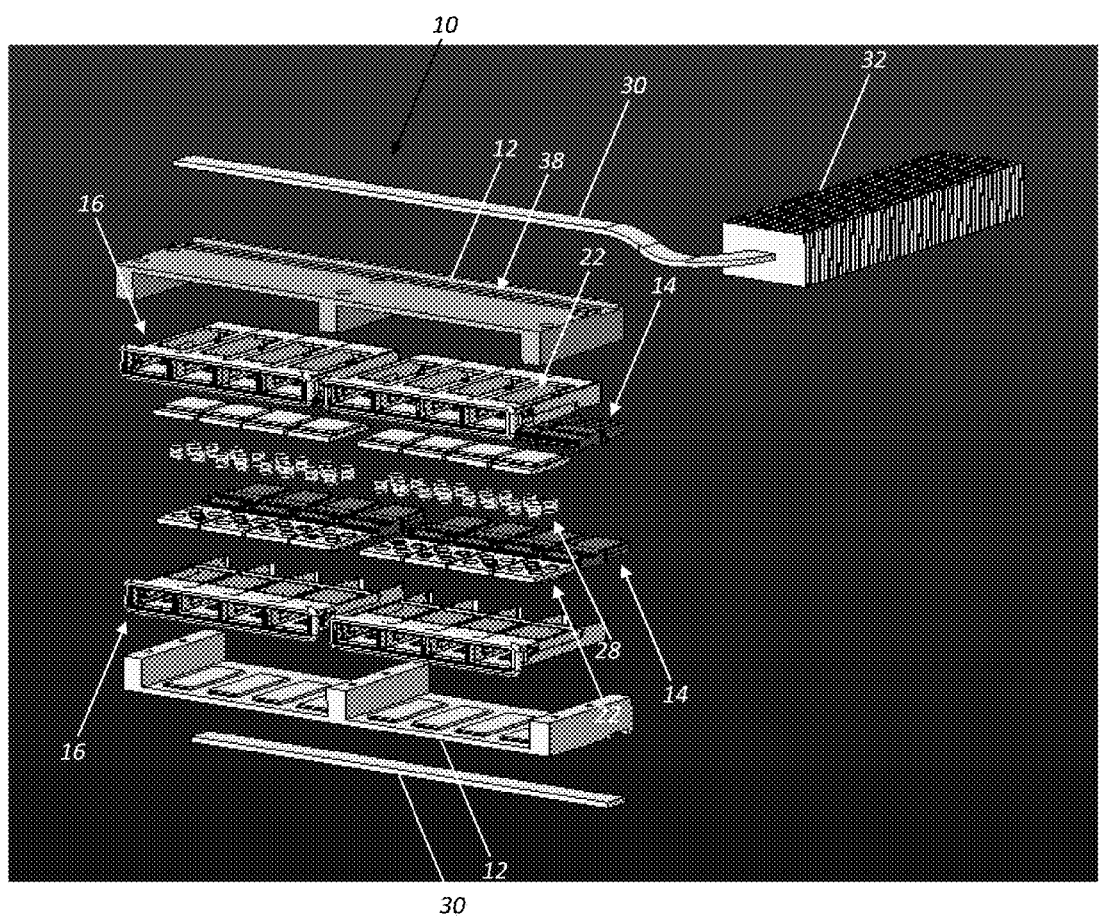
FIG. 7 is an exploded perspective diagram illustrating a still further embodiment of the optic module cage assembly of the proposed solution utilizing a plurality of stationary heatsinks, a plurality of floating heatsinks, and a plurality of floating connectors to accommodate a plurality of optic modules in a stacked or side-by-side configuration, with a plurality of heat pipes and plurality of heatsink fins thermally coupled to the plurality of stationary heatsinks to enhance cooling.

FIG. 7 is an exploded perspective diagram illustrating a still further embodiment of the optic module cage assembly 10 of the proposed solution utilizing a plurality of common stationary heatsinks 12, a plurality of floating heatsinks 22, and a plurality of floating connectors 14 to accommodate a plurality of optic modules (not illustrated) in a stacked or side-by-side configuration, with a plurality of heat pipes 30 and plurality of heatsink fins 32 thermally coupled to the plurality of common stationary heatsinks 12 to enhance cooling. Specifically, the common stationary heatsinks 12 are disposed about and bonded or otherwise fixedly attached to the optic module cage bodies 16. A portion of each of the common stationary heatsinks 12 protrudes through the associated optic module cage body 16 such that it selectively makes direct physical contact with the associated inserted optic module. Alternatively, each of the common stationary heatsinks 12 is in thermal communication with the inserted optic modules through the intervening wall of the optic module cage bodies 16. The floating heatsinks 22 are disposed adjacent to one another within and opposite the common stationary heatsinks 12, and each includes a portion that protrudes through the associated optic module cage body 16 such that it selectively makes direct physical contact with the associated inserted optic module opposite the common stationary heatsinks 12. The floating heatsinks 22 are biased apart and each into their associated optic module cage body 16 by one or more intervening spring members 28 such that each floating heatsink 22 serves to bias the associated inserted optic module into secure contact with the protruding portion of the associated common stationary heatsink 12, for example. In this respect, mirror image optic module cage assemblies 10 are provided and form a collective whole. The optic module cage bodies 16 also include one or more external spring members (not illustrated) that assist in securing the optic module cage bodies 16 within the optic shelf or rack (not illustrated) via the associated faceplate (not illustrated). The floating connectors 14 are disposed near the back of the optic module cage bodies 16 and are each permitted a degree of motion (especially up-and-down motion), such that a secure electrical connection may be made with the associated inserted optic module despite it being biased by the associated common floating heatsink 22 towards the protruding portion of the associated common stationary heatsink 12. The optic module cage assembly 10 is disposed in a recess (not illustrated) manufactured into the associated PCB (not illustrated), as opposed to being fixedly secured to the PCB. A plurality of heatsink fins 32 are mounted on the PCB and thermally coupled to one or more of the common stationary heatsinks 12 via a prismatic heat pipe 30, such as a flat heat pipe, which may be disposed in one or more recesses 38 manufactured into the one or more common stationary heatsinks 12. Again, it will be readily apparent to those of ordinary skill in the art that a variety of materials, similar configurations, spring members, and floating connectors 14 may be used, as appropriate. For example, the floating connectors 14 preferably make flexible electrical connection to the associated PCB. Advantageously, the common stationary heatsinks 12 span multiple optic module cage bodies 16/multiple optic modules.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An optic module cage assembly comprising:
   an optic module cage body configured to receive and retain one or more optic modules;
   a stationary heatsink fixedly attached to the optic module cage body;
   one or more spring members configured to bias the one or more optic modules towards the stationary heatsink when the one or more optic modules are retained in the optic module cage assembly; and
   one or more floating connectors configured to make electrical connections with the one or more optic modules when the optic modules are retained in the optic module cage assembly.

2. The optic module cage assembly of claim 1, wherein the stationary heatsink is disposed along one or more of a top and a bottom of the optic module cage body in a vertically-oriented configuration.

3. The optic module cage assembly of claim 1, wherein the stationary heatsink is disposed along one or more of either side of the optic module cage body in a horizontally-oriented configuration.

4. The optic module cage assembly of claim 1, wherein the stationary heatsink is a first stationary heatsink, and further comprising:
   a second stationary heatsink fixedly attached to the optic module cage body.

5. The optic module cage assembly of claim 1, further comprising:
   a floating heatsink coupled to the one or more spring members.

6. The optic module cage assembly of claim 1, further comprising:
   a heat pipe thermally coupled to the stationary heatsink; and
   a plurality of heatsink fins that are thermally coupled to the heat pipe.

7. The optic module cage assembly of claim 1, further comprising:
   a fan that is thermally coupled to the stationary heatsink.

8. The optic module cage assembly of claim 1, further comprising:
   a thermoelectric cooler that is thermally coupled to the stationary heatsink.

9. The optic module cage assembly of claim 1, wherein the optical module cage body has at least two optic modules retained therein and each of the at least two optic modules is in physical contact with a portion of the stationary heatsink.

10. The optic module cage assembly of claim 1, wherein the optical module cage body has a plurality of optic modules in a stacked and side-by-side configuration such that a first optic module is adjacent to a second optic module on a side and adjacent to a third optic module on a bottom.

11. A method of utilizing one or more optic modules in an optic module cage assembly, the method comprising:
    selectively inserting the one or more optic modules in the optic module cage assembly;
    contacting a stationary heatsink fixedly attached to an optic module cage body by the one or more optic modules;
    biasing the one or more optic modules towards the stationary heatsink when the one or more optic modules are retained in the optic module cage assembly; and
    connecting the one or more optic modules to respective one or more floating connectors configured to make electrical connections with the one or more optic modules.

12. The method of claim 11, wherein the stationary heatsink is disposed along one or more of a top and a bottom of the optic module cage body in a vertically-oriented configuration.

13. The method of claim 11, wherein the stationary heatsink is disposed along one or more of either side of the optic module cage body in a horizontally-oriented configuration.

14. The method of claim 11, wherein the stationary heatsink is a first stationary heatsink, and further comprising:
    contacting a second stationary heatsink fixedly attached to the optic module cage body by the one or more optic modules.

15. The method of claim 11, wherein the biasing is via a floating heatsink coupled to one or more spring members.

16. The method of claim 11, further comprising:
    operating a heat pipe to couple heat from the stationary heatsink to a plurality of heatsink fins that are thermally coupled to the heat pipe.

17. The method of claim 11, further comprising:
    operating a fan that is thermally coupled to the stationary heatsink.

18. The method of claim 11, further comprising:
    operating a thermoelectric cooler that is thermally coupled to the stationary heatsink.

19. The method of claim 11, wherein the optical module cage assembly has at least two optic modules retained therein and each of the at least two optic modules is in physical contact with a portion of the stationary heatsink.

20. An optic module cage assembly in one or more of a stacked configuration and a side-by-side configuration, the optic module cage body assembly comprising:
    an optic module cage body configured to receive a plurality of optic modules;
    a stationary heatsink fixedly attached to the optic module cage body;
    one or more spring members configured to bias the one or more optic modules towards the stationary heatsink when the one or more optic modules are retained in the optic module cage assembly; and
    one or more floating connectors configured to make electrical connections with the one or more optic modules when the optic modules are retained in the optic module assembly,
    wherein at least two optic modules are adjacent to one another vertically in the stacked configuration and at least two optic modules are adjacent to one another horizontally in the side-by-side configuration.

* * * * *